United States Patent
Baldauf et al.

(10) Patent No.: US 7,203,589 B2
(45) Date of Patent: Apr. 10, 2007

(54) METHOD FOR A TORQUE-BASED CONTROL OF AN INTERNAL COMBUSTION ENGINE

(75) Inventors: Johannes Baldauf, Wangen (DE); Michael Eckstein, Immenstaad (DE); Johanes Kech, Ravensburg (DE); Andreas Kunz, Friedrichshafen (DE); Christian Rehm, Friedrichshafen (DE); Jörg Remele, Hagnau (DE); Martin Schönle, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 11/486,430

(22) Filed: Jul. 13, 2006

(65) Prior Publication Data

US 2006/0282210 A1    Dec. 14, 2006

(51) Int. Cl.
*G06F 19/00* (2006.01)
*F02D 17/02* (2006.01)

(52) U.S. Cl. ............... 701/103; 701/115; 123/198 F

(58) Field of Classification Search ............. 701/103, 701/105, 102, 115; 123/478, 480, 198 F
See application file for complete search history.

(56) References Cited

U.S. PATENT DOCUMENTS 5,439,428 A * 8/1995 Slicker ................. 701/68
5,813,936 A * 9/1998 Kichima et al. ........... 180/197
6,443,125 B1 * 9/2002 Mendler ................ 123/316

FOREIGN PATENT DOCUMENTS

DE          100 00 918         7/2001

* cited by examiner

*Primary Examiner*—Hieu T. Vo
(74) *Attorney, Agent, or Firm*—Klaus J. Bach

(57) ABSTRACT

In a method for a torque-based control of an internal combustion engine wherein from an input value representing a desired engine power output a desired torque value is calculated, then the desired torque value is converted using a performance graph while taking another value into consideration to a first power output determining signal, which is then corrected by way of a relative efficiency and a power determining signal for controlling the drive torque is determined. The additional value corresponds to a relative friction moment, which is calculated from an actual deviation of the state of the engine from a standard state in which the relative friction moment is zero.

12 Claims, 4 Drawing Sheets

METHOD FOR A TORQUE-BASED CONTROL OF AN INTERNAL COMBUSTION ENGINE

BACKGROUND OF THE INVENTION

The invention relates to a torque-based control of an internal combustion engine wherein from an input value representing a desired power output, a desired torque is calculated which is converted under consideration of another value via a performance graph to a first engine power signal that is converted via a relative degree of efficiency to a second power control signal from which then a main power control signal is calculated and the engine output torque is determined via the main power output control signal.

The operating point of an internal combustion engine is provided by an operator via an input value representing the desired power output, for example, the gas pedal position. With a torque-based control of the internal combustion engine, the desired power output value of the operator is interpreted as a desired torque torque. From this, an electronic control unit calculates a power-output determining signal representing the desired engine output torque, such as the fuel injection amount.

DE 100 00 918 A1 discloses a torque-based function architecture. Herein, from the engine power output desired by the operator a desired torque value is determined which is converted via fuel amount performance graph—taking an additional value into consideration—into a fuel amount for the normal operation of an internal combustion engine. The additional value corresponds to a torque engagement for example from a drive slip control or an engine drag torque control. The fuel amount calculated for normal operation is then corrected using a relative degree of efficiency which is determined depending on an injection or, respectively, ignition angle, an exhaust gas recirculation rate, an air ratio and a charge air pressure and/or suction duct pressure. It is however a problem with this method that the temperature behavior of an internal combustion engine is only insufficiently taken into consideration with this torque-based function architecture.

It is the object of the present invention to provide a torque-based control for an internal combustion engine whose temperature-based behavior is more appropriately considered in the engine control procedure.

SUMMARY OF THE INVENTION

In a method for a torque-based control of an internal combustion engine wherein, from an input value representing a desired engine power output, a desired torque value is calculated, then the desired torque value is converted using a performance graph while taking another value into consideration to a first power output determining signal (veT), which is then corrected by way of a relative efficiency (ETAr) and a power determining signal for controlling the drive torque is determined. The additional value corresponds to a relative friction moment (MFr), which is calculated from an actual deviation of the state of the engine from a standard state in which the relative friction moment is zero.

The relative friction torque is calculated by way of a corresponding performance graph depending on an engine speed (rpm) and a virtual temperature. For the calculation of the vertical temperature two measured temperatures are interconnected by a mathematical function.

In a particular embodiment of the invention, the relative efficiency is determined mainly from the ambient temperature, the fuel temperature an ambient air pressure and an air mass deviation correction.

The advantages of the invention reside in the fact that, with a changed ambient condition, the desired torque is correctly converted to the output torque. By way of the mathematical function for calculating the virtual temperature, the calculation method can easily be adapted to different cooling circuits, for example, to sea water cooling and air cooling. The virtual temperature forms additionally a redundancy so that continued operation of the internal combustion engine is ensured even with a failure of a temperature sensor.

A preferred embodiment of the invention will be described below on the basis of the accompanying drawings.

DESCRIPTION OF A PREFERRED EMBODIMENT

Figure 1:
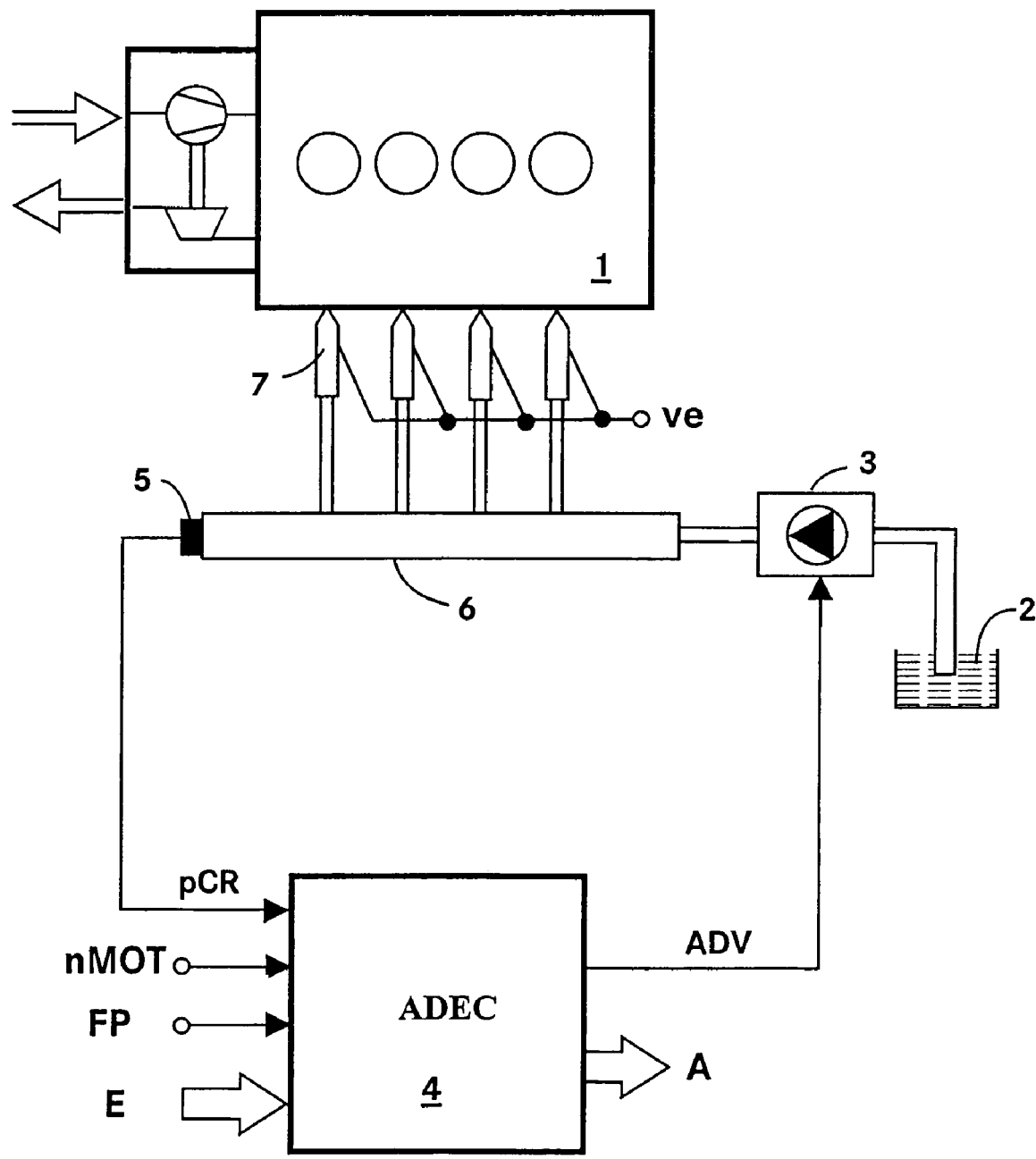
FIG. 1 shows schematically a control arrangement according to the invention.

FIG. 1 shows schematically an internal combustion engine 1 with an electronic control unit 4 in the internal combustion engine shown, the fuel is injected by way of a common-rail system which comprises the following components: Pumps 3 with a suction throttle for pumping the fuel from a fuel tank 2; a rail 6 for storing the fuel under pressure and injectors 7 for injecting the fuel from the rail 6 into the combustion chambers of the internal combustion engine 1.

The operation of the engine is controlled by the electronic control unit (ADEC) 4. The electronic control unit 4 includes the general components of a microcomputer system such as a microprocessor, I/O-components, buffer and storage components (EEPROM, RAM). In the storage components, the operational data relevant to the operation of the internal combustion engine 1 are recorded in the form of performance graphs/characteristic curves. By way of the stored operational data, the electronic control system 4 calculates from the input values the output values. In FIG. 1, for example, the following input values are represented: an actual rail pressure pCR which is measured by a rail pressure sensor 5; a speed signal nMOT of the internal combustion engine 1; a signal FP representing the power output value desired by the operating and an input value E. The input value E represents for example, the charge air pressure of a turbocharger and the temperature of the coolant or lubricant and of the fuel summed up.

In FIG. 1, as output values of the electronic control circuit 4, a signal ADV is shown for controlling the fuel suction throttle and an output value A is indicated. The output value A is representative for all the other control signals for controlling the internal combustion engine 1 for example a power output determining signal ve which, in the present case, is the fuel injection volume.

Figure 2:
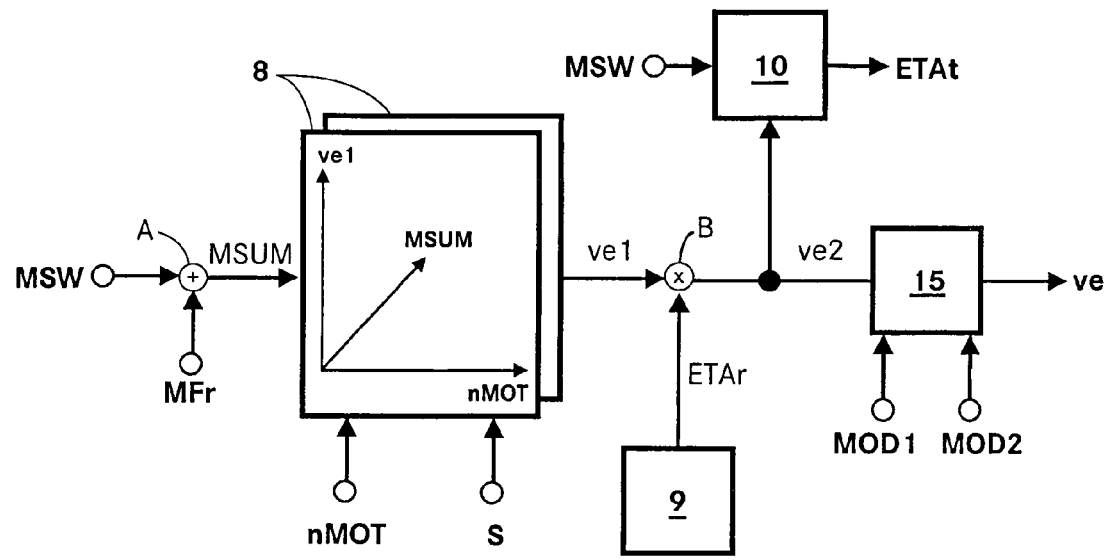
FIG. 2 is a block diagram of the torque-oriented function architecture.

FIG. 2 shows a block diagram of a torque-based function architecture. The input values are: a desired torque value MSW, a relative friction moment MFr, the engine speed nMOT and a signal S. The output values are: the output power determining signal ve and an actual efficiency signal ETAt. The desired torque value MSW is determined from an input value representing the desired power output, for example, the gas pedal position FP. At a location A, the desired torque value MSW and the relative friction moment MFr is calculated essentially from the deviation of the actual state of the internal combustion engine 1 relative to a standard state. The standard state as determined on the test bench is provided by the manufacturer of the internal combustion engine. The standard state is based on an internal combustion engine at operating temperature, an ambient air pressure of 1013 hectopascala, an ambient temperature of 25° C. and a constant fuel temperature. If the engine is operating under standard conditions, the relative friction moment MFr is zero. The sum of the desired torque MSW and the relative friction moment MFr is designated in FIG. 2 as the total torque MSUM. The total torque MSUM corresponds to one of the input values for the performance graph 8. By way of the performance graph 8, a first power output determining signal ve1 is calculated depending on the engine speed nMOT and the total torque MSUM. In practice, the first power output determining signal ve1 may correspond to an injection amount, unit: milligram/injection. By way of the signal S, the operator can switch over to different performance graphs 8. The different performance graphs may be optimized for example for exhaust gas-optimized or consumption-optimized operation.

At a location B, the first power determining signal ve1 is multiplied by a relative efficiency ETAr. The calculation of the relative efficiency occurs in a function block 9 and will be explained in connection with FIG. 3. The product of the first power output determining signal ve1 and the relative efficiency ETAr provides a second power output determining signal ve2. By way of a function block 10, an actual efficiency ETAt is determined from the second power determining signal ve2 and the desired torque value MSW. The actual efficiency ETAt is used for example for the calculation of an air mass-dependent torque limit. From the second power output determining signal ve2, the power output determining signal ve is determined via a function block 15 depending on a first operating mode MOD1 or a second operating mode MOD2. The operating mode, in practice, corresponds to the operation of the internal combustion engine as a full motor (MOD1) or a half motor (MOD2). With half motor operation, only half the cylinders are fired. The power determining signal ve corresponds to the required fuel amount for generating the desired output torque MSW of the internal combustion engine 1.

Figure 3:
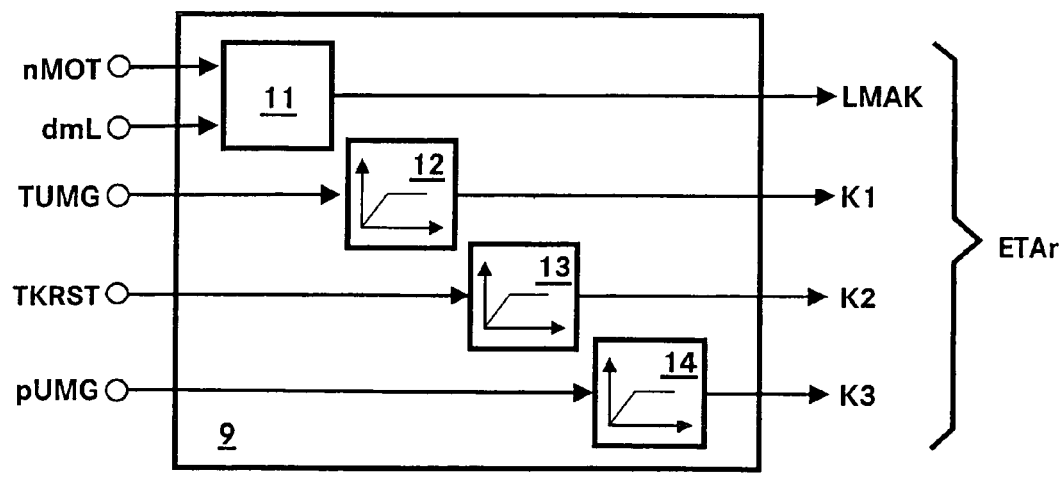
FIG. 3 is a block diagram showing the calculation of the relative efficiency.

FIG. 3 shows a block diagram for calculating the relative efficiency ETAr. The input values are: the engine speed nMOT, an air mass dmL, an ambient temperature TUMG, a fuel temperature TKRST and an ambient air pressure pUMG. The output value corresponds to the relative efficiency ETAr. Within the function block 9, there is a function block 11 for calculating an air mass deviation correction LMAK and characteristic curves 12–14. From the engine speed nMOT and the air mass deviation dmL, the air mass deviation correction LMAK is determined via the function block 11. By way of the air mass deviation correction LMAK, a correction is obtained when the air mass flow changes for example upon switching of turbochargers. From the ambient temperature TUMG a value K1 is calculated by way of the characteristic curve 12. From the fuel temperature TKRST, a value K2 is determined via the characteristic curve 13. The ambient air pressure pUMG is converted via a characteristic curve 14 to a value K3. The characteristic curves 12, 13 and 14 are so selected that, under standard conditions, the values for K1 to K3 are 1.

Figure 4:
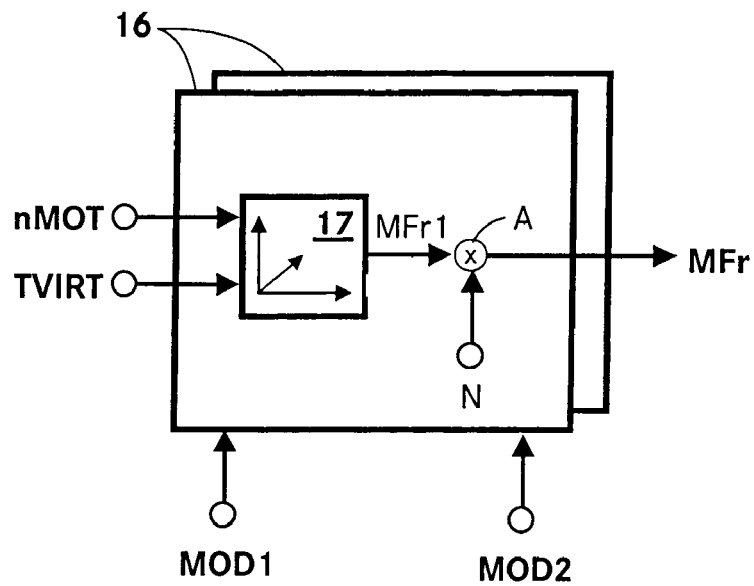
FIG. 4 is a block diagram for the calculation of the relative friction torque.

The FIG. 4 shows a block diagram for calculating the relative friction moment MFr. The input values are: the engine speed nMOT, the virtual temperature TVR1RT and the operating modes MOD1 or, respectively, MOD2. The output value corresponds to the relative friction moment MFr. The function block 16 contains a performance graph 17 and a multiplication location A. By way of the performance graph 17, a first relative friction moment MFR1 is determined depending on the engine speed nMOT and the virtual temperature TV1RT. At the location A, the first relative friction moment MFr1 is multiplied by the number of the cylinders N. The result represents the relative friction moment MFr. Via the signal operating mode MOD1 and MOD2, the function block 16 is selected for full-motor or half-motor operation. Of course, for the calculation of the relative friction moment MFr, the number of cylinders N can be omitted, so that the first relative friction moment MFr1 and the relative friction moment MFr are identical. Alternatively, the number of cylinders N can be taken into consideration exclusively by the performance graph 17.

Figure 5:
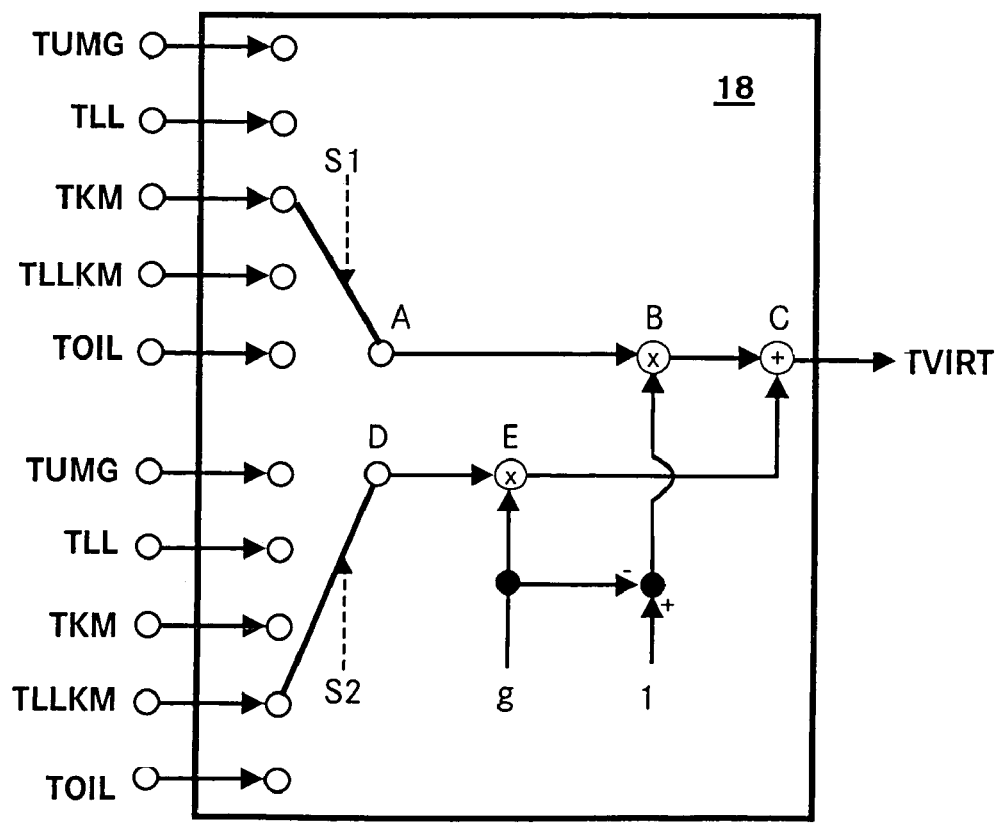
FIG. 5 is a block diagram for the calculation of the virtual temperature.

FIG. 5 shows a function block 8 for the calculation of the virtual temperature TV1RT. Via the function block 18, the virtual temperature TV1RT is calculated depending on input temperatures and a weighting factor g. The input values of the function block 18 are; the ambient temperature TUMG, a charge air-temperature TLL a coolant temperature TKM, a temperature of the charge air cooler coolant TLLKM and a lubricant temperature TOIL.

Each measuring value is supplied twice to the function block 18. By a switch S1 one of those temperatures is selected and supplied to a first signal path having the points AB. By a switch S2 also one temperature out of those input temperatures is selected and conducted along a second signal path having the points DE. In the representation of FIG. 5, the signal at point A consequently corresponds to the temperature of the coolant TKM. The signal at the point D corresponds to the temperature of the charge air cooler coolant TLLKM. At the point E of the second signal path, this temperature is weighted by the factor g. With the factor g, the calculation of the virtual temperature TV1RT can be adapted to different coolant circuits. It is well known that an internal combustion engine can be cooled for example by sea water or by ambient air. The result of this multiplication at the point E is supplied to the first signal path at point C. The signal at the point A of the first signal path is multiplied at a point B by the result of the calculation step one minus g and is then also supplied to the point C.

For the representation of the FIG. 5, the calculation of the virtual temperature TV1RT is obtained in accordance with the following mathematical function:

$$TV1RT = T1(1-g) + (T2*g)$$

Wherein
T1=first temperature, here: TKM
T2=second temperature, here: TLLKM
TV1RT=virtual temperature
TKM=coolant temperature
TLLKM=charge air cooler coolant temperature
g—weighting factor.

Figure 6:
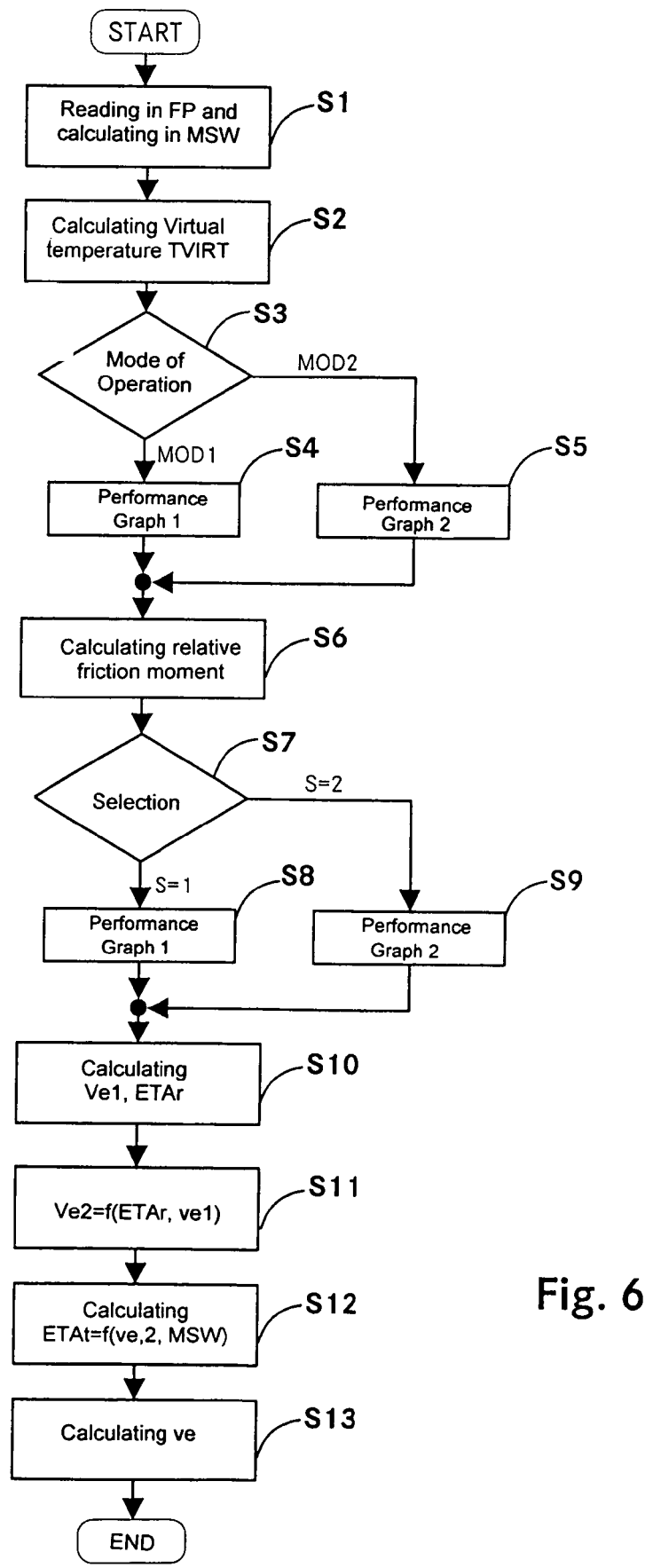
FIG. 6 is a block diagram showing the method steps.

FIG. 6 shows a program sequence plan. At S1, the operator demand FP is introduced and the desired torque MSW is calculated therefrom. Then the virtual temperature TV1RT is calculated in S2. In S3, it is examined which mode of operation is in effect. If the internal combustion engine is operated in a full motor mode (MOD1), in S4 a first performance graph is selected. The performance graph corresponds to the performance graph 17 of FIG. 4. If the internal combustion engine is operated in the half motor mode, the control follows the path including S5, that is, a second performance graph is selected. Then, in S6 the relative friction moment MFr is calculated. In S7, it is examined whether the operator has selected the consumption-optimized performance graph 1, S8, or the emission-optimized performance graph 2, S9. Then, in S10, the first power output determining signal ve1, for example, the fuel injection amount (milligram/injection) and the relative efficiency ETAr are calculated. With the relative efficiency ETAr, the first power output determining signal ve1 is corrected. The result of the correction is represented by the second power output determining signal ve2, S11. From the second power output determining signal ve2 and the desired torque value MSW then in S12 an actual efficiency ETAt is calculated. In S13, the power output determining signal ve is calculated from the second power output determining signal ve2. The power output determining signal ve corresponds to the fuel amount required for generating the desired torque value MSW at the output drive of the internal combustion engine 1. At this point, the program sequence is completed.

What is claimed is:

1. A method for the torque-based control of an internal combustion engine (1) comprising the steps of: calculating from an input value (FP) representing a desired engine power output a desired torque value (MSW), converting the desired torque value (MSW) to a first power output determining signal (ve1) via a performance graph (8) taking into consideration an additional value, correcting the first power output determining signal (ve1) by way of a relative efficiency (ETAr) to form a second power output determining signal (ve2), calculating from the second power output determining signal (ve2) a main power output determining signal (ve) and determining the control of the output torque of the internal combustion engine (1) from the power output determining signal (ve), said additional value corresponding to a relative friction moment (MFr) which is calculated essentially from a deviation of the actual state of the internal combustion engine (1) from a standard state in which the relative friction moment (MFr) is zero.

2. A method according to claim 1, wherein the relative friction moment (Mfr) is calculated by way of a performance graph (17) depending on an engine speed (nMOT) and a virtual temperature (TV1RT) of the internal combustion engine (1).

3. A method according to claim 2, wherein the relative friction moment (MFr) is calculated additionally dependent on the mode of operation (MOD1, MOD2) of the internal combustion engine (1).

4. A method according to claim 3, wherein the mode of operation of the internal combustion engine is one of a full motor mode (MOD1) or a half motor mode (MOD2).

5. A method according to claim 2, wherein the virtual temperature (TV1RT) of the internal combustion engine (1) is calculated via a mathematical function from two measured temperatures.

6. A method according to claim 5, wherein the virtual temperature (TV1RT) is calculated in accordance with the following mathematical function:

$$TV1RT = T1(1-g) + T2 \ast g$$

wherein:
T1 is a first temperature;
T2 is a second temperature
TV1RT is a virtual temperature, and
g is a weighting factor.

7. A method according to claim 1, wherein an actual efficiency (ETAt) is calculated from the desired torque value and the second power output determining signal (ve2).

8. A method according to claim 7, wherein an air mass dependent output torque limit is calculated on the basis of the actual efficiency (ETat).

9. A method according to claim 1, wherein the relative efficiency (ETAr) is determined essentially from an ambient temperature (TUMG), a fuel temperature (TKRST), an ambient air pressure (pUMG) and an air mass deviation correction (LMAK).

10. A method according to claim 9, wherein the air mass deviation correction (LMAK) is calculated depending on the engine speed (nMOT), and an air mass deviation (dm1).

11. A method according to claim 9, wherein the ambient temperature (TUMG), the fuel temperature (TKRST) and the ambient air pressure (PUMG) are each weighted by way of a characteristic curve (12, 13, 14).

12. A method according to claim 1, wherein the power output determining signal (ve) is calculated by weighting the second power output determining signal (ve2) on the basis of the operating mode (MOD1, MOD2).

* * * * *